United States Patent
Bergy et al.

[15] 3,689,639
[45] Sept. 5, 1972

[54] ANTIBIOTIC BERNINAMYCIN AND PROCESS FOR MAKING SAME

[72] Inventors: Malcolm E. Bergy, 2617 Lomond Drive; John H. Coats, 3419 Old Colony Road, both of Kalamazoo, Mich. 49001; Fritz Reusser, 6548 Trotwood, Portage, Mich. 49081

[22] Filed: Jan. 23, 1969

[21] Appl. No.: 793,290

[52] U.S. Cl. ................................424/117, 195/80
[51] Int. Cl. .............................................A61k 21/00
[58] Field of Search ........................424/117; 195/80

[56] References Cited

OTHER PUBLICATIONS

Chemical Abstracts I 54: 19840 c (1960)
Chemical Abstracts II 55:P 11760 c (1961)

*Primary Examiner*—Jerome D. Goldberg
*Attorney*—Eugene O. Retter and George T. Johannesen

[57] ABSTRACT

Antibiotic berninamycin producible by culturing *Streptomyces bernensis* Dietz, sp. nov., in an aqueous nutrient medium. Berninamycin inhibits the growth of *Bacillus subtilis* and can be used to control slime and corrosion in petroleum products caused by this bacterium.

7 Claims, 3 Drawing Figures

ANTIBIOTIC BERNINAMYCIN AND PROCESS FOR MAKING SAME

BRIEF SUMMARY OF THE INVENTION

Berninamycin (U-27,810) is a chemical compound which is producible by culturing a berninamycin-producing actinomycete in an aqueous nutrient medium. It is a peptide which has the property of adversely affecting the growth of gram-positive bacteria, for example, *Staphylococcus aureus*, *Bacillus subtilis*, and *Bacillus cereus*. Accordingly, berninamycin can be used alone or in combination with other antibiotic agents to prevent the growth of or reduce the number of bacteria, as disclosed above, in various environments. For example, it can be used to prevent deterioration of wool caused by *Bacillus cereus* in papermill operations.

CHARACTERIZATION OF BERNINAMYCIN

Crystalline berninamycin has the following chemical and physical properties:

Color: white

Elemental Analysis:
  Calculated for: $C_{53}H_{54}N_{15}O_{16}S$
  Found: C, 52.79; H, 4.52; N, 17.59; O, 20.85; S, 2.72.

Molecular weight based on the elemental analysis: about 1,150–1,200.

Melting point: > 290° C.

Optical Rotation: $[\alpha]_D^{25} = +149°$ (c, 0.67 percent in dimethylformamide).

Solubilities: Berninamycin is soluble in dimethylformamide and lower alcohols of from one to four carbon atoms, inclusive. Berninamycin is relatively insoluble in water, ether, cyclohexane, benzene, acetone, and ethyl acetate.

U.V. Absorption:
  Methanol
    max. 208 m$\mu$, a = 62.4
    max. 236 m$\mu$, a = 64.4
    Inflection at 255 m$\mu$, a = 62.4

Color reactions: Ninhydrin - negative

Figure 1:
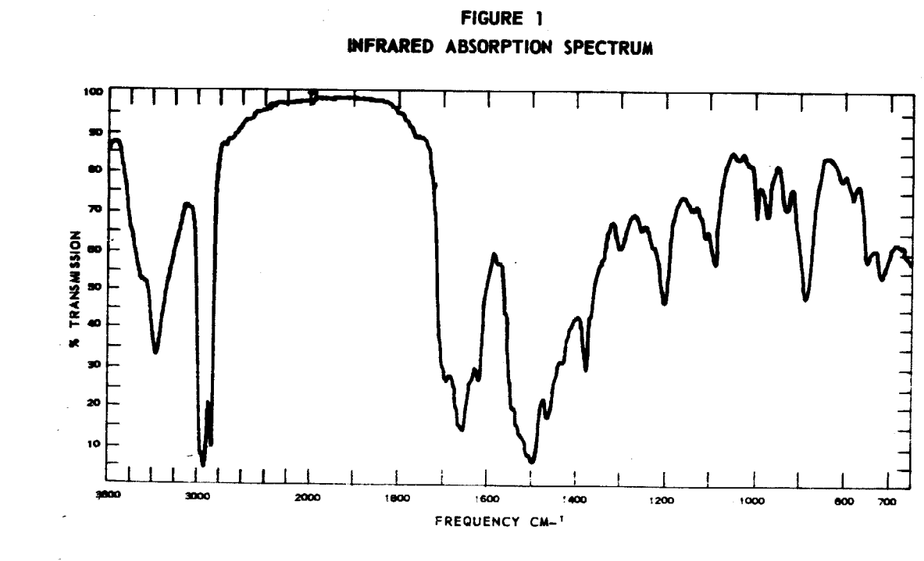

Infrared Spectrum: The infrared absorption spectrum of berninamycin suspended in mineral oil mull is reproduced in FIG. 1 of the drawing. Berninamycin shows peaks at the following wavelengths expressed in reciprocal centimeters:

| | | |
|---|---|---|
| 3460 (M) | 1545 (Sh) (S) | 1200 (M) |
| 3350 (S) | 1535 (Sh) (S) | 1135 (W) |
| 2945 (S) (oil) | 1530 (Sh) (S) | 1110 (M) |
| 2920 (S) (oil) | 1512 (Sh) (S) | 1085 (M) |
| 2840 (S) (oil) | 1505 (Sh) (S) | 1035 (W) |
| 1690 (S) | 1495 (S) | 995 (W) |
| 1672 (Sh) (S) | 1460 (S) (oil) | 970 (W) |
| 1665 (Sh) (S) | 1455 (S) (S) | 927 (W) |
| 1660 (Sh) (S) | 1425 (Sh) (S) | 885 (M) |
| 1653 (S) | 1375 (S) (oil) | 805 (W) |
| 1635 (Sh) (S) | 1300 (M) | 780 (W) |
| 1615 (S) | 1250 (M) | 745 (M) |
| 1575 (M) | 1225 (Sh) (M) | 715 (M) (oil) |
| 1555 (Sh) (M) | | |

The infrared absorption spectrum of berninamycin in a KBr pellet shows peaks at the following wavelengths expressed in reciprocal centimeters:

| | | |
|---|---|---|
| 3360 (S) | 1530 (Sh) (S) | 1085 (M) |
| 2970 (M) | 1505 (S) | 1020 (M) |
| 2940 (M) | 1495 (S) | 990 (W) |
| 1700 (Sh) (S) | 1425 (S) | 970 (W) |
| 1685 (S) | 1390 (S) | 925 (W) |
| 1657 (S) | 1295 (M) | 885 (M) |
| 1635 (S) | 1255 (M) | 805 (W) |
| 1615 (S) | 1195 (M) | 785 (W) |
| 1555 (Sh) (S) | 1135 (M) | 745 (M) |
| 1540 (Sh) (S) | 1105 (M) | 712 (M) |

Infrared absorption band intensities throughout this disclosure are indicated as "S", "M", and "W", respectively, and are approximated in terms of the backgrounds in the vicinity of the bands. An "S" band is of the same order of intensity as the strongest in the spectrum; "M" bands are between one-third and two-thirds as intense as the strongest band, and "W" bands are less than one-third as intense as the strongest band. These estimates are made on the basis of a percent transmission scale. Also, the designation "sh" appearing after a band reading denotes a "shoulder" type of band.

Figure 2:
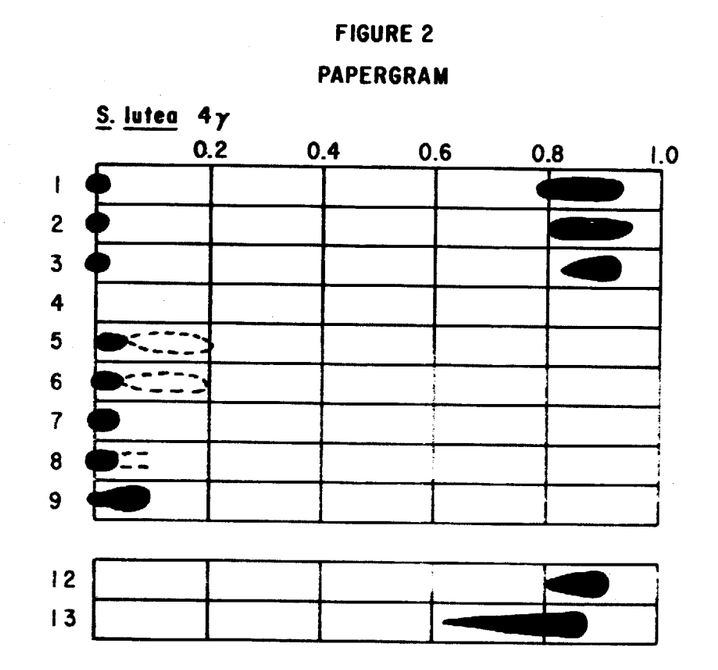

Papergram: The paper chromatographic pattern of berninamycin in the following solvent systems is as shown in FIG. 2 of the drawing:
1. 1-butanol, water (84:16), 16 hours.
2. 1-butanol, water (84:16) + 0.25 percent p-toluene sulfonic acid, 16 hours.
3. 1-butanol, acetic acid, water (2:1:1), 16 hours.
4. 2 percent piperidine (v/v) in 1-butanol, water, (84:16), 16 hours.
5. 1-butanol, water (4:96), 5 hours.
6. 1-butanol, water (4:96), + 0.25 percent p-toluene sulfonic acid, 5 hours.
7. potassium phosphate buffer, 0.1 M, pH 7.0.
8. 0.075 N $NH_4OH$ saturated with methyl isobutyl ketone.
9. benzene, methanol, $H_2O$ (1:1:2)
12. 1-butanol saturated with $H_2O$ + 2.0 percent p-toluene sulfonic acid
13. methanol, 15 percent NaCl (4:1) (Strips impregnated beforehand and dried with 0.1 M $Na_2SO_4$)

Berninamycin has antibacterial activity as shown in the following table. The test is a standard two-fold broth dilution test in Brain Heart Infusion broth.

| Test Organism | Minimum Inhibitory Concentration (mcg/ml) |
|---|---|
| *Staphylococcus aureus* | <1 |
| *Streptococcus hemolyticus* | <1 |
| *Streptococcus viridans* | <1 |
| *Streptococcus faecalis* | 12.5 |

THE MICROORGANISM

The actinomycete used according to this invention for the production of berninamycin is *Streptomyces bernensis* Dietz, sp. nov. One of its strain characteristics is the production of berninamycin. A subculture of the living organism was deposited without restriction and can be obtained from the permanent collection of the Northern Utilization and Research Division, Agricultural Research Service, U.S. Department of Agriculture, Peoria, Illinois, U.S.A. Its accession number in this repository is NRRL 3575.

The microorganism of this invention was studied and characterized by Alma Dietz of The Upjohn Research Laboratories.

DESCRIPTION OF THE MICROORGANISM

*Streptomyces bernensis* Dietz, sp. nov.

Color characteristics

Gray aerial mycelium. Melanin-negative. Appearance on Ektachrome is given in Table 1. Reference color characteristics on agar media are given in Table 2. The culture may be placed in the Gray (GY) and Yellow (Y) color series of Tresner and Backus [Appl. Microbiol. 11: 335–338 (1963)].

Microscopic characteristics

Sporophores long, flexuous (RF); some open spiral (RA) in the sense of Pridham et al. [Appl. Microbiol. 6: 52–79 (1958)]. Spores warty, some phalangiform [J. Bacteriol. 91: 1998–2005 (1966)]. Spore surface ridged.

Cultural and biochemical characteristics

See Table 3.

Carbon utilization

The ability of the culture to grow on carbon compounds was determined in the synthetic medium of Pridham and Gottlieb [J. Bacteriol. 56: 107–114 (1948)]and in their medium as modified by Shirling and Gottlieb [Intern. J. System. Bacteriol. 16: 313–340 (1966)]. In the former growth was good on L-arabinose, rhamnose, D-fructose, D-galactose, D-glucose, D-mannose, maltose, cellobiose, dextrin, soluble starch, glycerol, and D-mannitol; moderate on D-xylose, sodium acetate, sodium citrate, and sodium succinate; slight on sucrose, lactose, raffinose, dulcitol, D-sorbitol, inositol, sodium oxalate, and sodium tartrate. There was no growth on the control, salicin, phenol, cresol, sodium formate, or sodium salicylate. In the latter, there was no growth on the plain control and good growth on the glucose control. On L-arabinose, D-xylose, D-mannitol, D-fructose and rhannose growth was significantly better than on the basal medium without a carbon compound but somewhat less than on the glucose control. There was no growth on sucrose, inositol, raffinose, or cellulose.

Temperature

Good growth with heavy sporulation occurred at 18°–28 C. on Bennett's agar and at 24°–28° C. on Czapek's sucrose and maltose-tryptone agars. Growth was poor at 37° C. There was no growth at 55° C.

The characteristics of Streptomyces bernensis Dietz, sp. nov., NRRL 3575, are given in the following tables:

Table 1 Appearance of Streptomyces bernensis on Ektachrome

Table 2 Reference Color Characteristics of Streptomyces bernensis

Table 3 Cultural Characteristics of Streptomyces bernensis

Table 4 Comparison of S. bernensis with S. lavendulae 3372[1] ([1]These two microorganisms were compared because S. lavendulae 3372 is reported as producing theiomycetin, an antibiotic having reported characteristics similar to berninamycin. (See infra).) from written descriptions

TABLE 1

Appearance of Streptomyces bernensis on Ektachrome*

| Agar Medium | Surface | Reverse |
| --- | --- | --- |
| Bennett's | Gray | Brown |
| Czapek's sucrose | Slight gray | Colorless to pole gray |
| Maltose-tryptone | Gray | Tan |
| Peptone-iron | Trace gray | Melanin negative |
| 0.1% tyrosine Casein-starch | No surface growth Fair gray | Red Pale red-tan |

*Dietz, A., "Ektachrome Transparencies as Aids in Actinomycete Classification," Annals of the New York Academy of Sciences, 60: 152–154, 1954.

TABLE 2

Reference Color Characteristics of Streptomyces bernensis

| Agar Medium | | Color Harmony Manual 3rd ed., 1948 (*) | ISCC-NBS Method of Colors and a Dictionary of Color Names. 1955 (**) |
| --- | --- | --- | --- |
| Bennett's | S | 3ih(M) beige gray, mouse | 113g olive gray 265m medium gray |
| | R | 2ig(g) slate tan | 110g grayish olive 112m light olive gray |
| | P | 21i(g) covert brown | 110 gm grayish olive |
| Czapek's Sucrose | S | 2fe(g) covert gray | 94g light olive brown 112gm light olive gray |
| | R | 2ie(g) light mustard tan | 91gm dark grayish yellow 94g light olive brown 106g light olive |
| | P | 21g(m) mustard tan | 94m light olive brown 107g moderate olive |
| Maltose-tryptone | S | 2fe(g) covert gray | 94g light olive brown 112gm light olive gray |
| | R | 2ie(m) light mustard tan | 91gm dark grayish yellow 94g light olive brown 106g light olive |
| | P | 2ni(g) mustard brown | 107g moderate olive |
| Yeast extract —malt extract (ISP-2) | S | 3fe(g) silver gray | 63gm light brownish gray |
| | R | 2nl (g) covert brown | 95m moderate olive brown |
| | P | brown | 94m light olive brown |
| Oatmeal (ISP-3) | S | 21g(g) mustard tan 3fe(g) silver gray | 67g moderate olive 63gm light brownish gray |
| | R | 21e(g) mustard, old gold | 88gm dark yellow 94g light olive brown |
| | P | 2ng(g) dull gold | 94m light olive brown 106m light olive 107g moderate olive |
| Inorganic— salts starch (ISP-4) | S | 3fe(g) silver gray | 63gm light brownish gray |
| | R | 3ih(g) beige gray, mouse | 113g olive gray 265m medium gray |
| | P | 2ie(g) light mustard tan | 91gm dark grayish yellow 94g light olive brown 106g light olive |
| Glycerol— asparagine (ISP-5) | S | 3dc(g) natural | — |
| | R | 2ig(m) slate tan | 110g grayish olive 112m light olive gray |
| | P | 2ge(g) covert tan, griege | 94m light olive brown 109gm light grayish olive |

S = surface
R = reverse
P = pigment
(g) = glossy
(m) = matte

*Jacobson, E., W.C. Granville, and C.E. Foss. 1948. Color Harmony Manual, 3rd ed. Container Corporation of America, Chicago. Ill.
**Kelly, K.S., and D.B. Judd. 1955. The ISCC-NBS Method of Designating Colors and a Dictionary of Color Names. U.S. Dept. of Comm. Circ. 553.

TABLE 3

Cultural Characteristics of *Streptomyces bernensis*

| Medium | Surface | Reverse | Other |
| --- | --- | --- | --- |
| Agar Media | | | |
| Peptone-iron | Gray | Yellow | Melanin-negative |
| Calcium malate | Gray | Gray | No pigment Malate not solubilized |
| Glucose-asparagine | Gray | Yellow-tan | Yellow |
| Skim Milk | Trace gray | Yellow-tan | Yellow-tan pigment Casein solubilized |
| Tyrosine | Gray-lavender | Red-tan | Red-tan pigment Tyrosine not solubilized |
| Xanthine | Gray-lavender | Olive-gray-brown | Olive-gray pigment Xanthine solubilized |
| Nutrient starch | Gray-lavender | Olive-gray-brown | Pale olive-gray pigment Starch hydrolyzed |
| Yeast extract-malt extract | Gray-lavender | tan-brown | Yellow pigment |
| Bennett's | Gray | Brown | Olive pigment |
| Czapek's sucrose | Gray | Yellow-tan | Yellow-tan |
| Maltose-tryptone | Gray | Yellow-tan | Yellow-tan |
| Peptone-yeast extract-iron (ISP-6) | Very slight trace gray | colorless to yellow | Melanin-negative |
| Tyrosine (ISP-7) | Gray | Gray | Trace yellow pigment |
| Gelatin Media | | | |
| Plain | Gray-white aerial growth on surface ring | | Yellow pigment Gelatin liquefied |
| Nutrient | Trace white aerial growth on surface ring | | Yellow pigment gelatin ¼ liquefied |
| Broth Media | | | |
| Synthetic nitrate | | | Trace compact bottom growth nitrate not reduced to nitrite |
| Nutrient nitrate | Gray aerial growth on surface ring | | Trace compact bottom growth Nitrate reduction variable |
| Litmus milk | Trace gray aerial growth on brown surface ring | | No coagulation Peptonization; red-tan color pH 7.15 |

TABLE 4

Comparison of *S. bernensis* With *S. lavendulae* 3372 From Written Descriptions

| | *S. bernensis* | *S. lavendulae* 3372* Annual Report of Takeda Research Translation of Lab. 18: 44–48, 1959. | Japanese Patent Publication No. 11599/60 |
| --- | --- | --- | --- |
| Morphology | Sporophores straight to few open spiral Spores oval Spores 0.8~1.2 × 1.8~2.2µ | Sporophores straight Spores oval Conidium 0.8~1.2× 1.8~2.2µ | Aerial mycelium straight Conidium oval |
| Cultural Characteristics | | | |
| Czapek's agar | S Gray R Yellow-tan P Yellow-tan | White colorless None | Colorless to pale yellow None |
| starch agar | S Gray-lavender R Olive gray-brown P pale olive gray O Starch hydrolyzed | White colorless None Starch hydrolysis | White Colorless None Starch decomposed |
| Glucose-asparagine agar | S Gray R Yellow-tan P Yellow-tan | Cottony-white -pole grayish vinaceus Colorless None | Flocculent, from white to pale-grayish vinaceus Colorless None |
| Calcium malate agar | S Gray R Gray P None | white,few Colorless None | Scant, white Colorless None |
| Gelatin | Liquefaction | Liquefaction strong | Strong liquefying power |
| Nitrate reduction | Reduction variable | Reduction strong | Reduces nitrate |
| Milk | No coagulation Peptonization | No coagulation Peptonization | does not coagulate Peptonizes |
| Media with organic substances | Brown pigment | Brown pigment | Brown pigment |
| Carbon Utilization | | | not given |
| glucose | + | + | |
| xylose | (+) | + | |
| arabinose | + | − | |
| rhamnose | + | + | |
| fructose | + | + | |
| galactose | + | + | |
| saccharose | (−) | + | |
| maltose | + | + | |
| lactose | (−) | + | |
| raffinose | (−) | + | |
| inulin | − | + | |
| mannitol | + | − | |
| sorbitol | (−) | ± | |
| dulcitol | (−) | − | |
| inositol | (−) | − | |
| salicin | − | + | |
| Carbon Utilization | | | not given |
| sodium acetate | (+) | + | |
| sodium citrate | (+) | + | |
| sodium succinate | (+) | + | |
| control | − | − | |

+ = positive utilization  
(+)= moderate utilization  
±, (−)=faint growth, utilization doubtful  
− = no growth, no utilization S = Surface  
R = Reverse  
P = Pigment  
O = Other

*S. lavendulae is not publicly available from any known culture repository.

The new compound of the invention is produced when the elaborating organism is grown in an aqueous nutrient medium under submerged aerobic conditions.

It is to be understood also that for the preparation of limited amounts surface cultures and bottles can be employed. The organism is grown in a nutrient medium containing a carbon source, for example, an assimilable carbohydrate and a nitrogen source, for example, an assimilable nitrogen compound or proteinaceous material. Preferred carbon sources include glucose, brown sugar, sucrose, glycerol, starch, cornstarch, lactose, dextrin, molasses, and the like. Preferred nitrogen sources include corn steep liquor, yeast, autolyzed brewer's yeast with milk solids, soybean meal, cottonseed meal, cornmeal, milk solids, pancreatic digest of casein, distillers' solids, animal peptone liquors, meat and bone scraps, and the like. Combinations of these carbon and nitrogen sources can be used advantageously. Trace metals, for example, zinc, magnesium, manganese, cobalt, iron, and the like, need not be added to the fermentation media since tap water and unpurified ingredients are used as media components.

Production of the compound of the invention can be effected at any temperature conducive to satisfactory growth of the microorganism, for example, between about 18° and 40° C., and preferably between about 20° and 32° C. Ordinarily, optimum production of the compound is obtained in about 2 to 10 days. The medium normally remains basic during the fermentation. The final pH is dependent, in part, on the buffers present, if any, and in part on the initial pH of the culture medium.

When growth is carried out in large vessels and tanks, it is preferable to use the vegetative form, rather than the spore form, of the microorganism for inoculation to avoid a pronounced lag in the production of the new compound and the attendant inefficient utilization of the equipment. Accordingly, it is desirable to produce a vegetative inoculum in a nutrient broth culture by inoculating this broth culture with an aliquot from a soil or a slant culture. When a young, active vegetative inoculum has thus been secured, it is transferred aseptically to large vessels or tanks. The medium in which the vegetative inoculum is produced can be the same as, or different from, that utilized for the production of the new compound, as long as it is such that a good growth of the microorganism is obtained.

The new compound of the invention is a peptide. It is soluble in dimethylformamide and lower alcohols of from one to four carbon atoms, inclusive. Berninamycin is relatively insoluble in water, ether, cyclohexane, benzene, acetone, and ethyl acetate.

A variety of procedures can be employed in the isolation and purification of berninamycin, for example, solvent extraction, partition chromatography, silica gel chromatography, liquid-liquid distribution in a Craig apparatus, and crystallization from solvents. Solvent extraction procedures are preferred for commercial recovery inasmuch as they are less time consuming and less expensive.

In a preferred recovery process, berninamycin is recovered from its culture medium by separation of the mycelia and undissolved solids by conventional means such as by filtration or centrifugation. The antibiotic is then removed from the filtered or centrifuged broth by extraction. For the extraction of berninamycin from the filtered broth, water-immiscible solvents in which it is soluble, for example, methyl ethyl ketone, 1-butanol, 2-butanol or ethyl acetate can be used. Methyl ethyl ketone is the preferred extraction solvent. The extract containing the antibiotic can be concentrated in vacuo to a crude preparation containing berninamycin. This preparation can be used in environments where pure berninamycin is not desired or necessary.

Purification of a concentrated solvent extract containing berninamycin, as described above, can be accomplished by partition chromatography with a solvent system comprising dimethylformamide:water:ethyl acetate:Skellysolve B (isomeric hexanes) (4:0.4:10:10). Fractions from the partition chromatography column can be concentrated to dryness in vacuo to yield a relatively pure preparation of berninamycin.

Further purification of a berninamycin preparation, for example that obtained from the partition chromatography column described above, can be accomplished by the use of silica gel chromatography and crystallization. The silica gel column can be developed with a solvent system consisting of methylene chloride:methanol (96:4). Fractions from the silica gel column can be clarified by filtration and concentrated further to induce crystallization of berninamycin.

The new compound of the invention, berninamycin, can be used to inhibit the growth of the microorganism *Bacillus subtilis* in packed yeast. Also, it can be used to inhibit this organism in silkworm production.

Upon acidic hydrolysis of berninamycin there is obtained a compound which has been given the trivial name berninamycinic acid. For example, upon treating berninamycin with 100 ml. of 6 N hydrochloric acid at reflux under nitrogen for about 24 hrs., there is obtained berninamycinic acid. Other mineral acids, for example, sulfuric, phosphoric, and the like, can be used in the hydrolysis reaction. The strength of the mineral acid used can be varied from about 1 to 8 N. The temperature of the reaction can be varied from about 40 to 100° C. The time of the reaction, which will vary with the strength of the acid used, as well as the temperature of the reaction, will vary from 12 to 48 hrs.

Berninamycinic acid can be recovered from the hydrolysis reaction by cooling the hydrolysis solution, neutralizing with a base, for example sodium hydroxide, if a non-volatile mineral acid has been used, and then evaporating the mixture to dryness. The dry residue can be extracted with a weak aqueous organic acid, for example, acetic, butyric, citric, and the like, at about 0.2 to 3 N to remove soluble impurities. The extracted yellow insoluble residue can be subjected to centrifugation or filtration to yield amorphous berninamycinic acid. Salts of berninamycinic acid can be prepared by dissolving berninamycinic acid in a minimal amount of water containing a mineral base such as sodium hydroxide, potassium hydroxide, or ammonium hydroxide, or an aliphatic amine such as methylamine or ethylamine at from about 0.1 to about 3 N. Berninamycinate salt crystallizes upon refrigeration. For recrystallization, the salt is redissolved in a minimal amount of water and water-miscible organic solvent, e.g., lower alcohols, or acetone can be used. The resulting crystals of the berninamycinate salt can be recovered by filtration and dried.

Figure 3:
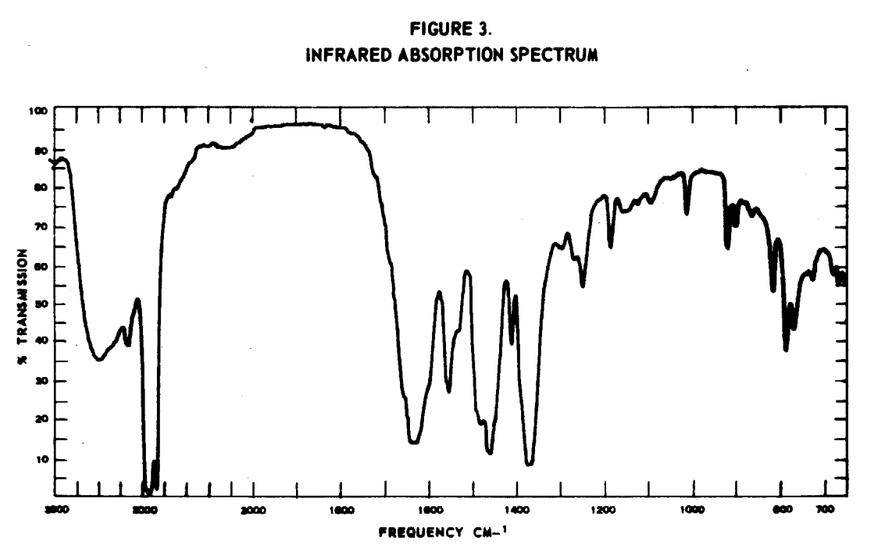

Berninamycinic acid is conveniently characterized in the form of its sodium salt, because as the free acid, it is relatively insoluble in water. These characteristics are as follows:

Color of crystals: Orange needles.
Melting Point: > 290° C.
Elemental Analysis:
  Calc'd for: $C_{10}H_8O_7N_2SNa_2$ (molecular weight 346):
  C, 34.68; H, 2.13; N, 8.09; O, 32.36; S, 9.24; Na, 13.29.
  Found: C, 35.77; H, 2.38; N, 8.12; O, 29.93; S, 8.20; Na, 13.54.
Optical Rotation: $[\alpha]_{25}^D = -0.04°$ ($H_2O$, $c = 0.49$).
Solubility: Sodium berninamycinate is soluble in water, and relatively insoluble in aqueous acids and in common organic solvents such as lower alcohols, and acetone. It has slight solubility in aqueous bases.
U.V. Absorption Spectrum in water:
  Maxima at
    202 m$\mu$, $a = 63.25$
    233 m$\mu$, $a = 49.88$
    294 m$\mu$, $a = 60.13$
    418 m$\mu$, $a = 10.43$
  Inflection at 270 m$\mu$, $a = 35.13$
  Slight inflection at 328 m$\mu$, $a = 14.28$
Ninhydrin Test - Negative Berninamycinic acid has a characteristic infrared absorption spectrum when suspended in mineral oil mull. This spectrum is reproduced in FIG. 3 of the drawing. Berninamycinic acid shows peaks at the following wave lengths expressed in reciprocal centimeters:

| | | | |
|---|---|---|---|
| 3380 (S) | 1530 (S) | 1245 (M) | 860 (W) |
| 3110 (M) | 1490 sh(S) | 1185 (W) | 810 (W) |
| 2950 (S)(oil) | 1480 (S) | 1155 (W) | 782 (M) |
| 2920 (S)(oil) | 1463 (S)(oil) | 1122 (W) | 762 (M) |
| 2850 (S)(oil) | 1408 (M) | 1093 (W) | 720 (M) |
| 1653 sh (S) | 1385 sh (S) | 1050 (W) | 675 (M) |
| 1637 (S) | 1367 (S)(oil) | 1010 (W) | 663 (M) |
| 1558 sh (S) | 1292 (W) | 915 (W) | 642 (M) |
| 1554 (S) | 1265 (W) | 895 (W) | |

Berninamycinic acid can be used in solutions as an optical filter, or incorporated into optical films for absorbing U.V. rays.

The following examples are illustrative of the process and products of the present invention but are not to be construed as limiting. All percentages are by weight and all solvent mixture proportions are by volume unless otherwise noted.

EXAMPLE 1

Part A. Fermentation

A soil stock of *Streptomyces bernensis* Dietz, sp. nov., NRRL 3575, is used to inoculate a series of 500-ml. Erlenmeyer flasks, each containing 100 ml. of sterile, preseed medium consisting of the following ingredients:

| | |
|---|---|
| Glucose monohydrate | 25 g./liter |
| Pharmamedia* | 25 g./liter |
| Tap water q.s. | Balance |

*Pharmamedia is an industrial grade of cottonseed flour produced by Trader's Oil Mill Company, Fort Worth, Texas.

The flasks are grown for 3 days at 28° C. on a rotary shaker.

One shake flask (100 ml.) of the preseed inoculum, described above, is used to inoculate a 20-liter seed tank containing 13 liters of sterile seed medium consisting of the following ingredients:

| | |
|---|---|
| Wilson's Peptone Liquor No. 159* | 10 g./liter |
| Cornsteep liquor | 10 g./liter |
| Pharmamedia | 2 g./liter |
| Glucose monohydrate | 10 g./liter |
| Tap water | Balance |

*Wilson's Peptone Liquor No. 159 is a preparation of hydrolyzed proteins of animal origin.

The seed tank is grown for 2 days at a temperature of 28° C., with aeration at a rate of 10 standard liters/minute and agitation at a rate of 400 rpm.

The seed tank, described above, is used to inoculate a 400-liter fermentor containing 250 liters of the following sterile medium:

| | |
|---|---|
| Glucose monohydrate | 15 g./liter |
| Dextrin | 25 g./liter |
| Corn gluten meal | 20 g./liter |
| Oatmeal | 15 g./liter |
| Tap water | Balance |

Before sterilization of the medium, the pH of the medium is adjusted to 7.2 with a 50 percent aqueous solution of sodium hydroxide. The fermentation cycle is 5 days during which time the temperature is controlled at 30° C., filtered air is supplied at a rate of 200 standard liters per minute, and agitation at the rate of 320 rpm. A representative berninamycin fermentation assays about 15 biounits/ml. (BU/ml.) at 5 days against the microorganism *Sarcina lutea*. The assay is a standard disc plate assay wherein a unit volume (0.08 ml.) of solution containing the material to be assayed is placed on a 12.7 mm. assay disc. This disc is then placed on an agar plate seeded with the assay microorganism. A biounit (BU) is defined as the concentration of the antibiotic which gives a 20 mm. zone of inhibition under standard assay conditions. Thus, if for example a fermentation beer has to be diluted one one-hundredth to give the 20 mm. zone of inhibition, the potency of such beer is 100 BU/ml.

Part B. Extraction

Whole beer (100 ml. assaying 15 BU/ml. against *Sarcina lutea*), obtained by a fermentation as described above, is filtered with the aid of diatomaceous earth filter aid. The filter cake is washed with one-tenth volume of water and discarded. The filtrate and wash is combined and extracted with two-thirds volume of methyl ethyl ketone. The aqueous phase (90 ml., 1 BU/ml.) is discarded but the solvent phase (35 ml., 24 BU/ml.) is concentrated in vacuo to a solid impure preparation of berninamycin; yield, 60 mg. assaying 8 BU/mg. of berninamycin on the S. lutea disc plate assay.

Part C. Purification

An impure preparation of berninamycin, obtained as described in Part B above, is purified by partition chromatography. The solvent system for the partition chromatography is dimethylformamide:$H_2O$:ethyl acetate:Skellysolve B (4.0:0.4:10:10). The solvents are mixed and the phases separated. Diatomaceous earth (760 g.) is slurried in approximately 9.0 liters of upper phase and lower phase is added (304 ml.) (0.4 ml./g. of diatomaceous earth) with vigorous stirring. The mixture is packed into a 3-inch diameter glass column to a constant high of 23 inches with flowing upper phase. An impure preparation of berninamycin (33.4 g.), obtained by the procedure described in Part B, is dissolved in 50 ml. of lower phase and mixed with 100 g. of diatomaceous earth and enough upper phase to make a pourable mixture. This mixture is packed onto the top of the prepared column bed. One-liter fractions are collected at a flow rate of 4 liters/hour. Fractions are spotted on an agar tray seeded with S. lutea to determine the active fractions. Fractions 9, 10, 11, 12 are combined and 4.0 liters of water, containing 8 g. of dissolved sodium chloride, are added. The solid (white) phase is separated by filtration, washed with water and dissolved in 50 ml. of acetone. The acetone solution is clarified by filtration and concentrated to dryness in vacuo; yield, 205 mg. of berninamycin assaying 302 BU/mg. on the S. lutea assay.

The partition chromatography column fractions can be analyzed by thin-layer chromatography on silica gel. The thin-layer plates are prepared from silica gel $HF_{254}$ (60 g., E. Merck AG) suspended in 0.2 M $KH_2PO_4$ (50 ml.), 0.2 M $Na_2HPO_4$ (50 ml.) and MeOH (20 ml.). The plates are air dried then activated at 120° C. for 2 hours. The development solvent system consists of methylene chloride:methanol (95:5). Detection of berninamycin is by UV absorption with a 254 m$\mu$ light. Berninamycin has an $R_f$ of about 0.3–0.4.

Further purification of berninamycin is accomplished by silica gel column chromatography. Silica gel No. 7734 (Merck-Darmstadt, 200 g.) is mixed with Skellysolve B, poured into a glass chromatography tube and packed to a constant height with Skellysolve B. A preparation of berninamycin obtained by partition chromatography, (163 BU/mg., 3.0 g.) is dissolved in 5 ml. of dimethylformamide and mixed with 10 g. of silica gel. The dimethylformamide is removed by evaporation in high vacuum. The dried berninamycin-silica gel mixture is dropped onto a layer of Skellysolve B remaining on top of the column bed. The Skellysolve B is drained to the top of the berninamycin layer. Developing solvent (methylene chloride-methanol, 96:4) is added and the column is developed at a flow rate of 0.5 ml./minute. Twenty-ml. fractions are collected. The fractions are analyzed by thin-layer chromatography on activated silica gel $HF_{254}$ which have been prepared with 0.1 M $KH_2PO_4$–0.1 M $Na_2HPO_4$ (1:1), pH 6.7. The development solvent is methylene chloride-methanol (95:5). Berninamycin ($R_f$= approximately 0.3–0.4) is detected by a $KMNO_4$–$NAIO_4$ spray reagent.

Fractions 95–130 are combined and concentrated in vacuo to a volume of approximately 100 ml. The solution is clarified by filtration and concentrated further in vacuo to a volume of approximately 30 ml. Crystallization of berninamycin starts during the last concentration. The crystalline mixture is stored 2 days at −20° C. The crystals of berninamycin are removed by filtration, washed lightly with methanol, and dried in vacuo to a constant weight; yield, 1.26 g. of berninamycin crystals assaying 236 BU/mg. against the microorganism S. lutea.

EXAMPLE 2

Sodium Berninamycinate

Two grams of berninamycin, as prepared in Example 1, is suspended in 100 ml. of 6 N HCl and heated at reflux under nitrogen for 24 hrs. The reaction mixture is cooled and evaporated to dryness under reduced pressure at about 40° C. The residue is extracted with 40 ml. of 0.5 N acetic acid to remove soluble impurities. The remaining extract is centrifuged to yield an amorphous cake of berninamycinic acid. This cake is dissolved in 20 to 30 ml. of 1 N NaOH and the solution is refrigerated. Crystals of sodium berninamycinate appear. These crystals are filtered off and redissolved in a minimal volume of water. Ethanol (about 50 ml.) is added to induce crystallization of sodium berninamycinate as orange needles. These crystals are filtered off and washed with cold ethanol; yield, 300 mg. of sodium berninamycinate.

The characteristics of berninamycin, described herein, are similar to those reported in the literature for the antibiotic theiomycetin. [See M. Shibata: Takeda Kenyusho Nempo 18, 44–48 (1959) (Annual Reports of the Takeda Research Laboratories); and Japanese Pat. No. 11,599 which issued on Aug. 20, 1960 to S. Tatsuoka et al., assigned to Takeda]. Neither of these references enable an ordinary person skilled in the art to make theiomycetin. Further, none of the publications cited above, nor any other known prior publication, enables an ordinary person skilled in the art to make the antibiotic of the subject case. Thus, since none of the above publications are "enabling disclosures" they are not valid references under 35 U.S.C. 102. [See the Board of Appeals decision in *Ex parte Alexander D. Arqoudelis*, 849 O.G. 1237].

We claim:

1. A composition of matter assaying at least 15 biounits/ml. of berninamycin on the S. lutea assay, a compound which a. is effective in inhibiting the growth of various gram-positive bacteria; and, in its essentially pure crystalline form;

b. is soluble in dimethylformamide, and 1-butanol; and is relatively insoluble in water, ether, cyclohexane, benzene, acetone, and ethyl acetate;

c. has the following elemental analyses: C, 52.79; H, 4.52; N, 17.59; O, 20.85; S, 2.72;

d. has an estimated molecular weight of about 1,150–1,200;

e. has a characteristic infrared absorption spectrum as shown in FIG. 1 of the accompanying drawing; and, f. has a characteristic papergram pattern as shown in FIG. 2 of the accompanying drawing.

2. Composition of matter of claim 1 in dry form, said composition of matter assaying at least 8 biounits/mg. of berninamycin on the S. lutea assay.

3. The compound, berninamycin, according to claim 1, in its essentially pure form.

4. The compound, berninamycin, according to claim 1, in its essentially pure crystalline form.

5. A process for making the compound defined in claim 1 which comprises cultivating *Streptomyces bernensis* Dietz, sp. nov., having the identifying characteristics of NRRL 3575, in an aqueous nutrient medium under aerobic conditions until substantial antibiotic activity is imparted to said medium by the production of berninamycin.

6. A process according to claim 5 which comprises cultivating *Streptomyces bernensis* Dietz, sp. nov., having the identifying characteristics of NRRL 3575, in an aqueous nutrient medium containing a source of assimilable carbohydrate and assimilable nitrogen under aerobic conditions until substantial antibiotic activity is imparted to said medium by the production of berninamycin and isolating the berninamycin so produced.

7. A process according to claim 6 in which the isolation comprises filtering the medium, extracting the filtrate with a water-immiscible solvent for berninamycin, and recovering berninamycin from the solvent extract.

* * * * *